United States Patent
Oike

(10) Patent No.: US 9,280,310 B2
(45) Date of Patent: Mar. 8, 2016

(54) INFORMATION PROCESSING DEVICE AND COMPUTER-READABLE RECORDING MEDIUM PROVIDING FIRST AND SECOND DISPLAY SCREENS WITH DIFFERENT BACKGROUND IMAGES

(71) Applicant: BROTHER KOGYO KABUSHIKI KAISHA, Nagoya, Aichi (JP)

(72) Inventor: Jun Oike, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/602,712

(22) Filed: Jan. 22, 2015

(65) Prior Publication Data
US 2015/0205558 A1 Jul. 23, 2015

(30) Foreign Application Priority Data
Jan. 22, 2014 (JP) .................................. 2014-009598

(51) Int. Cl.
*G06F 15/00* (2006.01)
*G06F 3/12* (2006.01)
*G06K 1/00* (2006.01)
*G06F 3/048* (2013.01)

(52) U.S. Cl.
CPC .............. *G06F 3/1292* (2013.01); *G06F 3/048* (2013.01); *G06F 3/1205* (2013.01); *G06F 3/1253* (2013.01)

(58) Field of Classification Search
USPC .................................................. 358/1.1–1.18
See application file for complete search history.

(56) References Cited

U.S. PATENT DOCUMENTS

2009/0165115 A1* 6/2009 Toumura et al. ................. 726/12
2009/0240703 A1* 9/2009 Yoshino .......................... 707/10

FOREIGN PATENT DOCUMENTS

JP 2007-166538 A 6/2007

* cited by examiner

*Primary Examiner* — Douglas Tran
(74) *Attorney, Agent, or Firm* — Scully, Scott, Murphy & Presser, P.C.

(57) ABSTRACT

An information processing device may cause a display unit to display a first screen, in response to accepting an instruction for displaying the first screen. The first screen may include M pieces of first images indicating M pieces of data stored in a first storage unit of the information processing device and include a first background image. The information processing device may cause the display unit to display a second screen, in response to receiving, from a server device, N pieces of identification information for identifying N pieces of data stored in a second storage unit of the server device. The second screen may include N pieces of second images indicating the N pieces of identification information and include a second background image which is different from the first background image.

22 Claims, 6 Drawing Sheets

INFORMATION PROCESSING DEVICE AND COMPUTER-READABLE RECORDING MEDIUM PROVIDING FIRST AND SECOND DISPLAY SCREENS WITH DIFFERENT BACKGROUND IMAGES

CROSS-REFERENCE TO RELATED APPLICATIONS

This application claims priority to Japanese Patent Application No. 2014-009598, filed on Jan. 22, 2014, the contents of which are hereby incorporated by reference into the present application.

TECHNICAL FIELD

The present specification discloses a technique for an information processing device capable of processing various kinds of data.

DESCRIPTION OF RELATED ART

A technique for a plurality of devices to cooperate to execute desired process (e.g., print process) is known.

SUMMARY

When a plurality of screens corresponding to a plurality of devices are switched from one to another, a user may not be able to easily understand to which device a screen currently being displayed corresponds.

The present application discloses a non-transitory computer-readable recording medium storing computer-readable instructions for an information processing device. The computer-readable instructions, when executed by a processor of the information processing device, may cause the information processing device to perform: accepting an instruction for displaying a first screen; causing a display unit of the information processing device to display the first screen, in response to accepting the instruction for displaying the first screen, the first screen including M pieces of first images indicating M pieces of data stored in a first storage unit of the information processing device, the M being an integer equal to 1 or more, the first screen including a first background image as a background of the M pieces of first images; executing a first process using first selected data corresponding to a first image selected by a user from among the M pieces of first images via the first screen; requesting a server device, via a communication interface of the information processing device, for identification information which identifies data stored in a second storage unit of the server device; causing the display unit to display a second screen, in response to receiving, from the server device via the communication interface, N pieces of identification information for identifying N pieces of data stored in the second storage unit, the second screen including N pieces of second images indicating the N pieces of identification information, the N being an integer equal to 1 or more, the second screen including a second background image as a background of the N pieces of second images, the second background image being different from the first background image; and executing a second process using second selected data corresponding to a second image selected by the user from among the N pieces of second images via the second screen.

EMBODIMENT (Configuration of Communication System)

Figure 1:
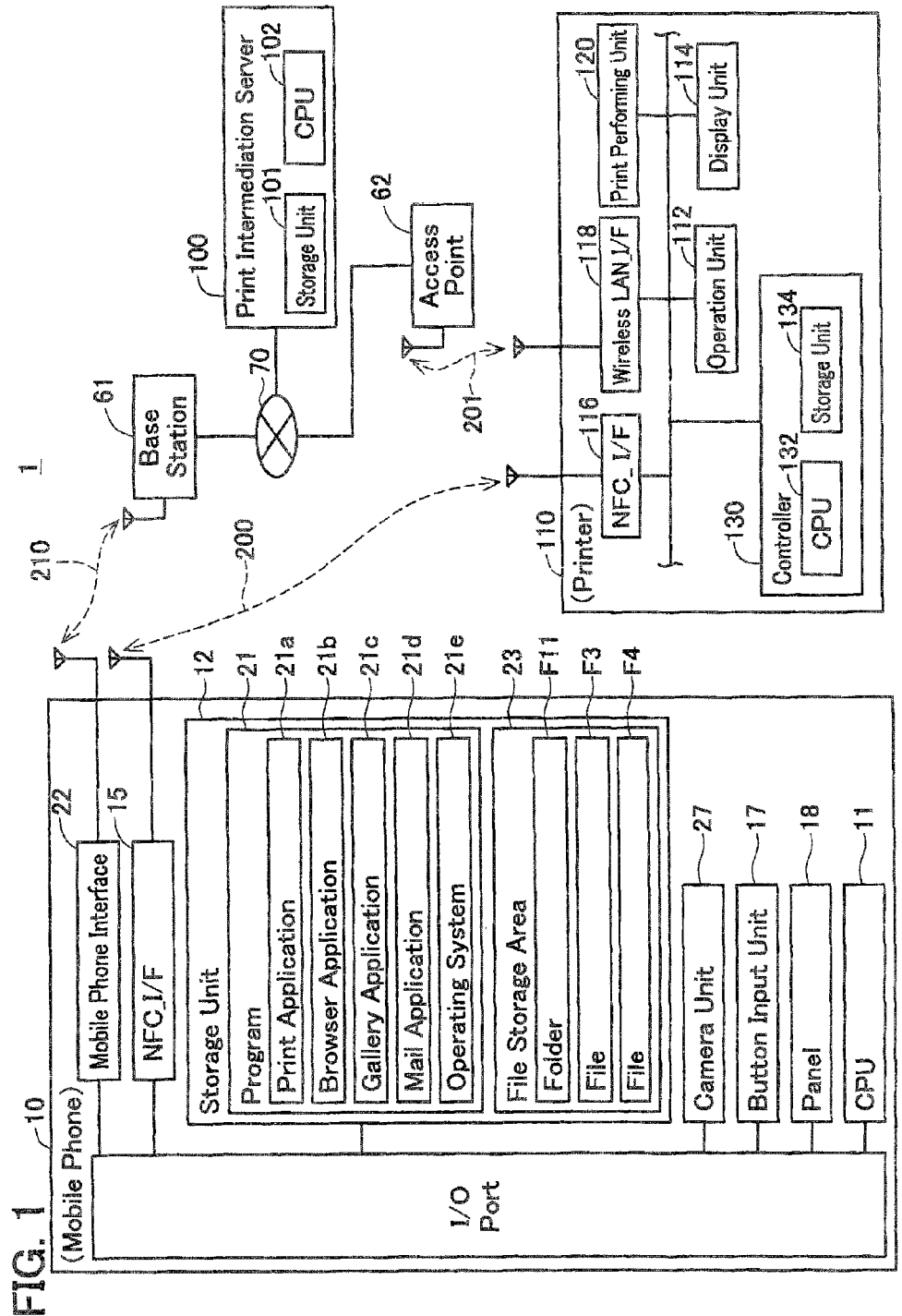
FIG. 1 illustrates a configuration of a communication system.

FIG. 1 shows a block diagram of a communication system 1. The communication system 1 comprises a mobile phone 10, a printer 110, an access point 62, a print intermediation server 100, and a base station 61. The access point 62 is a known relay device. It is possible for the print intermediation server 100 to communicate with the mobile phone 10 via the Internet 70 and the base station 61. It is also possible for the print intermediation server 100 to communicate with the printer 110 via the Internet 70 and the access point 62.

(Configuration of Mobile Phone 10)

The Android (registered trademark of Google Inc.) platform is installed in the mobile phone 10. The mobile phone 10 mainly comprises a CPU 11, a storage unit 12, an NFC (also referred to as "Near Field Communication") interface 15, a button input unit 17, a panel 18, a mobile phone interface 22 and a camera unit 27. The CPU 11 performs control of various functions in accordance with programs stored in the storage unit 12, various kinds of signals that are sent and received via the NFC_I/F 15, or the like. The CPU 11 also functions as various means by reading a program. In the present specification the term "interface" is abbreviated as "I/F".

The storage unit 12 is provided with a program 21 and a file storage area 23. The storage unit 12 may also be configured by combining a RAM (also referred to as Random Access Memory), a ROM (also referred to as Read Only Memory), a flash memory, an HDD (also referred to as hard disk), and the like. The storage unit 12 may be a computer readable storage medium. The computer readable storage medium is a non-transitory medium, such as a ROM, RAM, flash memory, hard disk, etc. An electrical signal carrying a program to be downloaded from a server, etc. on the Internet is not included in the non-transitory medium.

The program 21 is provided with a print application 21a, a browser application 21b, a gallery application 21c, a mail application 21d and an operating system 21e (hereinafter referred to as "OS 21e"). The OS 21e is an OS of an Android platform. The print application 21a and the mail application 21 d are applications for Android (registered trademark of Google Inc.).

The print application 21a is an application for executing printing at the printer 110 utilizing the print intermediation server 100. The print application 21a is an application that is provided by the vendor of the printer 110. The print application 21a may be installed in the mobile phone 10 from an unshown server on the Internet, or may be installed in the mobile phone 10 from a medium that is shipped together with the printer 110.

The browser application 21b is an application for displaying Web data acquired from the print intermediation server 100 on the panel 18. The gallery application 21c is an application for displaying an image that is based on image data on the panel 18, and performing various kinds of conversion processing (color correction or the like) on the image data. The mail application 21d is an application for sending electronic mail via the wireless communication 210.

The OS 21e is a program for providing basic functions shared by the print application 21a and the mail application 21d. The OS 21e manages exchange of data between the print application 21a and the mail application 21d. That is, the OS 21e is provided with a sharing function that controls exchange of data between a sharing source application and a sharer application.

The file storage area 23 is an area for storing various types of data files. The file storage area 23 includes a folder F11 and a plurality of files F3 and F4. The folder F11 is an area for storing more than one file. Since the folder F11 is used, each file can be stored in the file storage area 23 in a hierarchic structure. The files F3 and F4 are files representing images captured using the mobile phone 10, for example. The files F3 and F4 may be files of any file format, and may be, for example, files of a bitmap format such as JPEG files of a vector format or files of a text format.

The NFC_I/F 15 is an I/F (that is, an IC chip or a communication circuit) for executing wireless communication 200 (hereunder, referred to as "NFC communication 200") in accordance with the NFC scheme for so-called "short-range wireless communication". The NFC scheme is a wireless communication scheme based on, for example, International Standard ISO/IEC 21481 or 18092. The mobile phone I/F 22 performs wireless communication 210 with the base station 61. The wireless communication 210 may be cellular wireless communication such as 3G or 4G cellular communication. The button input unit 17 includes keys for executing various functions of the mobile phone 10. The button input unit 17 may be integrally formed as a touch panel with the panel 18. The panel 18 displays information of various functions of the mobile phone 10.

(Configuration of Printer 110)

The printer 110 is a peripheral device that is capable of performing a print function (that is, a peripheral device of a PC or the like). The printer 110 comprises an operation unit 112, a display unit 114, an NFC interface 116, a wireless LAN (also referred to as "Local Area Network") interface 118, a print performing unit 120 and a controller 130. The respective units 112 to 130 are connected to a bus line (reference symbol is omitted).

The operation unit 112 includes a plurality of keys. A user can issue various instructions to the printer 110 by operating the operation unit 112. The display unit 114 is a display for displaying various kinds of information. The print performing unit 120 is a printing mechanism such as an inkjet or laser printing mechanism. The configuration of the NFC_I/F 116 is the same as the configuration of the NFC_I/F 15 that is described above, and hence a description thereof is omitted here.

The wireless LAN_I/F 118 is an I/F (that is, an IC chip or communication circuit) for executing wireless communication (hereunder, referred to as "Wi-Fi communication") in accordance with a Wi-Fi system that is defined by the Wi-Fi Alliance. The Wi-Fi system is, for example, a wireless communication system based on the IEEE (referred to as The Institute of Electrical and Electronics Engineers, Inc.) 802.11 standards and standards (for example, 802.11a, 11b, 11g, 11n, etc.) conforming to the IEEE 802.11 standards. The wireless LAN_I/F 118 may be an I/F for executing wireless communication through an access point (that is, infrastructure-based wireless communication), or may be an I/F for executing wireless communication without passing through an access point (for example, ad-hoc wireless communication or wireless communication according to the Wi-Fi Direct system).

The controller 130 comprises a CPU 132 and a storage unit 134. The CPU 132 is a processor that executes various kinds of processing in accordance with an unshown program stored in the storage unit 134. The storage unit 134 is constituted by a RAM or a ROM or the like. Similarly to the storage unit 12, the storage unit 134 may be a computer-readable storage medium.

(Configuration of Print Intermediation Server 100)

The print intermediation server 100 is a server installed on the Internet and provided by a vendor of the printer 110. However, in a modification, the print intermediation server 100 may also be a server provided by a provider different from the vendor of the printer 110, for example. The print intermediation server 100 is provided with a storage unit 101 and a CPU 102. The CPU 102 is a processor that executes various types of process according to a program (not shown) stored in the storage unit 101. The storage unit 101 is an area for storing various types of information (e.g., submit contents X1 and X2 which will be described later) submitted (that is, registered) from an external device such as the mobile phone 10. Here, the concept of "submitting various types of information to the print intermediation server 100" includes a concept of "uploading various types of information to the print intermediation server 100." The storage unit 101 may also be an area for storing various types of information without using any hierarchic structure. That is, the storage unit 101 may be an area without using any concept of folders.

The print intermediation server 100 is a server for executing printing intermediation between an external device (for example, the mobile phone 10) and a printer (for example, the printer 110). That is, the print intermediation server 100 converts a file that is submitted from an external device to generate print data in a data format that can be interpreted by a printer, and supplies the print data to the relevant printer. Accordingly, even if the external device is not equipped with a printer driver for converting the file to print data, the external device can cause the printer to execute printing of the file by submitting the file to the print intermediation server 100.

(Points to Note Regarding the Description in the Present Specification)

Hereunder, in some cases the CPU 11 that executes a program such as an application or the OS 21e is simply described by only the program name. For example, the description "print application 21a" can mean "the CPU 11 that executes the print application 21a". In the present specification, the description "the CPU 11 of the portable phone 10 receives various kinds of information" includes the technical meaning that "the CPU 11 of the portable phone 10 acquires various kinds of information via the mobile phone I/F 22 and the NFC_I/F 15". Further, the description "the CPU 11 of the portable phone 10 sends various kinds of information" includes the technical meaning that "the CPU 11 of the portable phone 10 outputs various kinds of information via the mobile phone I/F 22 and the NFC_I/F 15".

Here, a definition of the words "data" and "information" will be explained. In the present specification, "information" is used as a concept superordinate to "data". Consequently, "A data" may be rephrased as "A information". Further, even if the "information" has a different format as "data" (e.g., text format, binary format, flag format, etc.), this is treated as the same information as long as it is recognized that the meaning is the same. For example, as long as the device treats this as information indicating that the number of print copies is two parts, data of the text format "COPY=2", and data of the binary format "10" is the same information. However, the above described distinction between "data" and "information" is not a strict distinction, and exceptional treatment of these terms is also allowed.

(Advance Preparation)

The user of the mobile phone 10 performs the following advance preparation in order to cause the printer 110 to perform printing by utilizing the print intermediation server 100.

That is, the user of the mobile phone 10, for example, utilizes the mobile phone 10 to apply for an account at the print intermediation server 100, and acquires account information AC1 from the print intermediation server 100. The account information AC1 includes, for example, a user ID and a password. Note that, instead of utilizing the mobile phone 10, the user may utilize another device (for example, an unshown PC or the like) to register the account information AC1 in the print intermediation server 100. Once the account information of the user is registered in the print intermediation server 100, the user can cause the printer 110 to perform printing by utilizing the print intermediation server 100.

(Operation of Print Application 21a)

Operation of the print application 21a will be described using sequence diagrams in FIG. 2 and FIG. 3. In the description example according to the present embodiment, a case will be described where contents of information submitted to the print intermediation server 100 transition from submit contents X1 to submit contents X2 described in FIG. 2. In the submit contents X1, account information AC1, printer ID, file F1, file name N1 of the file F1 and job identification information ID1 are associated with each other, and the account information AC1, the printer ID, file F2, file name N2 of the file F2 and job identification information ID2 are associated with each other. On the other hand, in the submit contents X2, the account information AC1, the printer ID, file F3, file name N3 of the file F3 and job identification information ID3 are associated with each other in addition to the contents of the submit contents X1. Here, the job identification information ID1 to ID3 are specific information to identify print jobs using the files F1 to F3.

When the user of the mobile phone 10 desires to execute a submit process or print process which will be described later, the user activates the print application 21a in S200. The CPU 11 may also activate the print application 21a based on the OS 21e in response to the user's inputting operation of activating the print application 21a via the button input unit 17.

In S224, the print application 21a supplies a login request including the account information AC1 to the print intermediation server 100 via the mobile phone I/F 22.

Upon acquiring the login request from the mobile phone 10, the print intermediation server 100 executes authentication of the account information AC1 included in the login request in S225. More specifically, the print intermediation server 100 determines whether or not the account information AC1 included in the login request has already been registered with the print intermediation server 100. Upon succeeding in the authentication of the account information AC1, the print intermediation server 100 creates an authentication token. The authentication token created may be a one-time authentication token used only in the submit process. In S226, the print intermediation server 100 supplies a login success result including the authentication token to the mobile phone 10.

Upon receiving the login success result, in S228, the print application 21a creates a file list request including the authentication token received in S226 and the printer ID. Note that before S228, the print application 21a may acquire a list of printer IDs associated with the account information AC1 from the print intermediation server 100 and select a target printer ID to which the file should be submitted from the list. In this case, the printer ID included in the file list request in S228 is the selected printer ID. A screen for selecting a printer ID may be displayed and a printer ID specified by the user input may be selected. In S230, the print application 21a supplies the file list request to the print intermediation server 100 via the mobile phone I/F 22 (that is, by executing the wireless communication 210).

Upon acquiring the file list request from the mobile phone 10, the print intermediation server 100 executes authentication of the authentication token and the printer ID included in the file list request. Upon determining that the authentication token and the printer ID are already registered (that is, authentication has been successful), the print intermediation server 100 creates a file list including the file name and job identification information associated with the information and supplies the created file list to the mobile phone 10 in S235. That is, the file list includes information on the print job using the file submitted to the print intermediation server in association with the printer ID. The file list may include printing status information indicating a printing status of the file associated with the authentication token and the printer ID. Note that the print intermediation server 100 may further include the file submitted for the printer ID using a method other than the submit process in the file list.

A case will be described by way of example in the present embodiment where information on the submit contents X1 is saved in the print intermediation server 100. In this case, the print intermediation server 100 creates a file list based on the submit contents X1. Therefore, the file list includes two file names N1 and N2 and two pieces of job identification information ID1 and ID2 for identifying two files F1 and F2.

In response to acquiring the file list from the print intermediation server 100 via the mobile phone I/F 22, the print application 21a causes a server storage contents screen to be displayed on the panel 18 using the file list in S240. The server storage contents screen is a screen for displaying a list of files saved in the print intermediation server 100.

Figure 4:
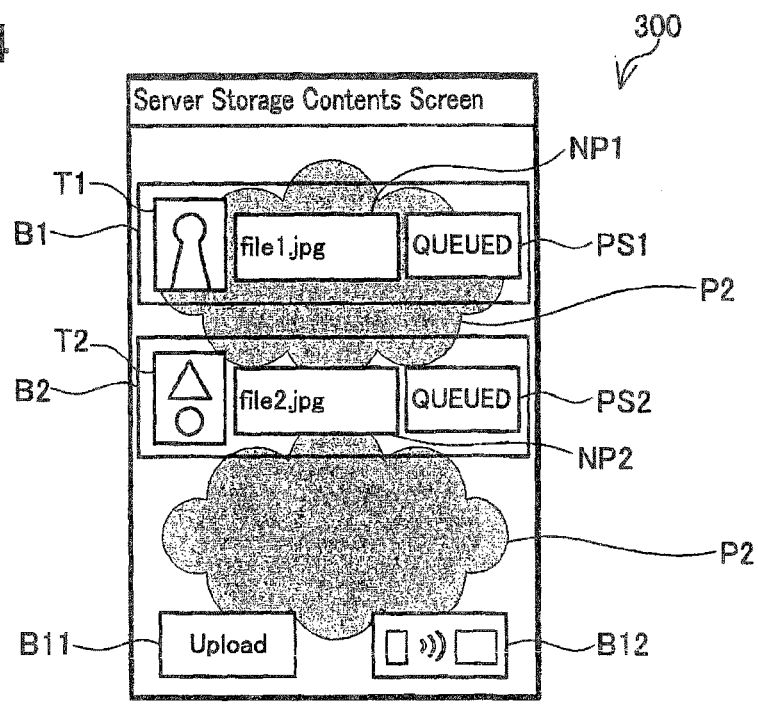
FIG. 4 illustrates an example of a server storage contents screen.

FIG. 4 illustrates an example of the server storage contents screen 300. The server storage contents screen 300 includes button images B1, B2, B11 and B12 which are aligned in accordance with a predetermined layout. The button images B1 and B2 are images illustrating the respective files F1 and F2 stored in the print intermediation server 100. The button images B1 and B2 are images for accepting a selection of a file to be subjected to a print process which will be described later.

The button image B1 includes a thumbnail image T1, a job name image NP1 and a printing status image PS1. The thumbnail image T1 is a reduced image of an image formed of the file F1. The job name image NP1 is an image illustrating a job identification information ID1 of the file F1. The printing status image PS1 is an image illustrating a printing status of the file F1. The printing status image PS1 may also be displayed based on the printing status information included in the file list. Examples of the printing status image PS1 include "QUEUED" indicating a printing standby status, "ERROR" indicating a printing error state and "DONE" indicating printing completion. The contents of the button image B2 are the same as those of the button image B1.

The button image B11 is an image for accepting an input of a submit process execution instruction which will be described later. The button image B12 is an image for accepting an input of a print process execution instruction which will be described later.

Furthermore, the server storage contents screen 300 includes a second background image P2 as a background of the button images B1, B2, B11 and B12. The second background image P2 is an image for indicating that the server storage contents screen 300 is a screen for displaying a file image stored in the print intermediation server 100. The second background image P2 has a design that reminds the user of the print intermediation server 100 which is a cloud server and may be a design that uses, for example, a cloud network as a motif (e.g., a design using a cloud as a motif).

In S245, the print application 21a accepts inputs of various types of process execution instructions. Upon accepting an input of a submit process execution instruction (submitted in S245), the flow proceeds to S250 where a submit process starts. The submit process execution instruction may be accepted by performing a tap input to the button image B11 in FIG. 4.

(Submit Process)

The submit process is a process for submitting (that is, registering) a file representing a printing target image to the print intermediation server 100 using the print application 21a. In the present embodiment, a case will be described by way of example where the file F3 is submitted to the print intermediation server 100. That is, a case will be described as an example where a transition takes place from the submit contents X1 to the submit contents X2 by the submit process. Furthermore, as shown in FIG. 1, a case will be described in the present embodiment as an example where the file storage area 23 of the mobile phone 10 stores the folder F11 and the files F3 and F4.

In the submit process, the user of the mobile phone 10 needs not be located near the printer 110. For example, the user can submit a file representing an image captured by the mobile phone 10 from outside to the print intermediation server 100.

Figure 5:
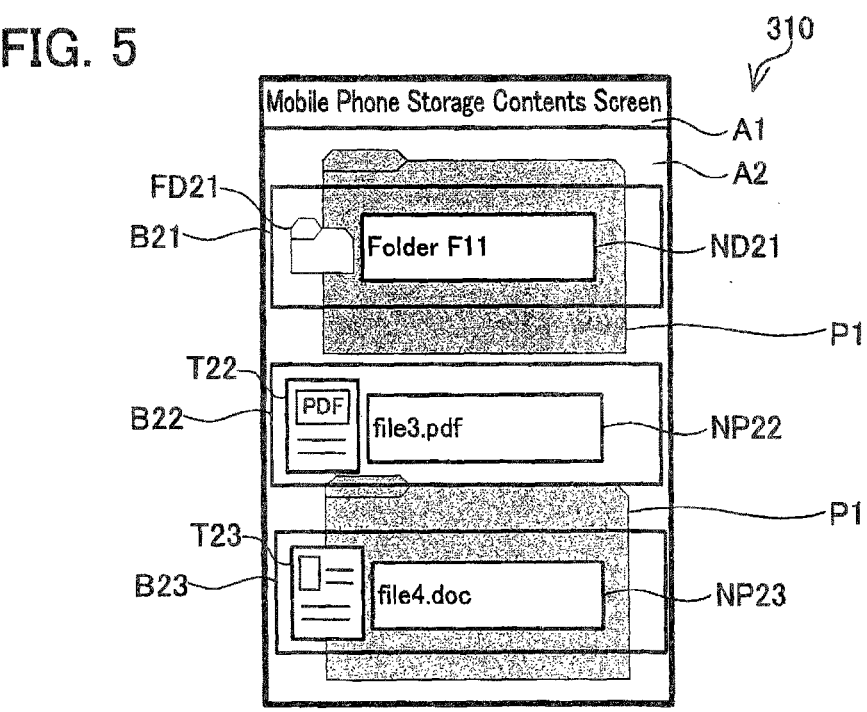
FIG. 5 illustrates an example of a mobile phone storage contents screen.

In S250, the print application 21a causes a mobile phone storage contents screen to be displayed on the panel 18. The mobile phone storage contents screen is a screen to display a list of files stored in the file storage area 23 of the mobile phone 10. FIG. 5 illustrates an example of the mobile phone storage contents screen 310. The mobile phone storage contents screen 310 includes button images B21 to B23 which are aligned in accordance with the predetermined layout (that is, the same layout as the server storage contents screen 300). The button image B21 is an image for accepting a selection of the folder F11 stored in the file storage area 23. In response to the selection of the button image B21, the mobile phone storage contents screen 310 may be switched so that a button image indicating a file in the folder F11 is displayed on the mobile phone storage contents screen 310. The button image B21 includes a folder image FD21 and a folder name image ND21. The folder image FD21 is an image indicating the folder F11. The folder name image ND21 is an image indicating the folder name of the folder F11.

The button images B22 and B23 are images indicating files F3 and F4 respectively stored in the file storage area 23. The button images B22 and B23 are images for accepting a selection of a file to be subjected to the submit process. The button image B22 includes a thumbnail image T22 and a file name image NP22. The thumbnail image T22 is a reduced image of an image represented by the file F3 stored in the file storage area 23. The file name image NP22 is an image representing a file name N3 of the file F3. Note that the contents of the button image B23 are the same as those of the button image B22.

The mobile phone storage contents screen 310 includes a first background image P1 as a background of the button images B21 to B23. The first background image P1 is an image to show that the mobile phone storage contents screen 310 is a screen to display a file image stored in the file storage area 23 of the mobile phone 10. The design of the first background image P1 is a design that reminds the user of a function of storing a file in the mobile phone 10 and may be a design that uses, for example, a data storage folder as a motif. More specifically, the design of the first background image P1 may be a design that uses a portable document folder made of thick paper or resin or the like as a motif.

In S255, the print application 21a accepts a selection of any one of the button images B21 to B23. A selection of a button image may also be accepted by detecting a tap input to any one of the respective areas in which the button images B21 to B23 are displayed. The description of the present embodiment will be continued below by taking a case where the button image B22 is tapped by the user and the file F3 is selected as a submit target as an example.

Figure 6:
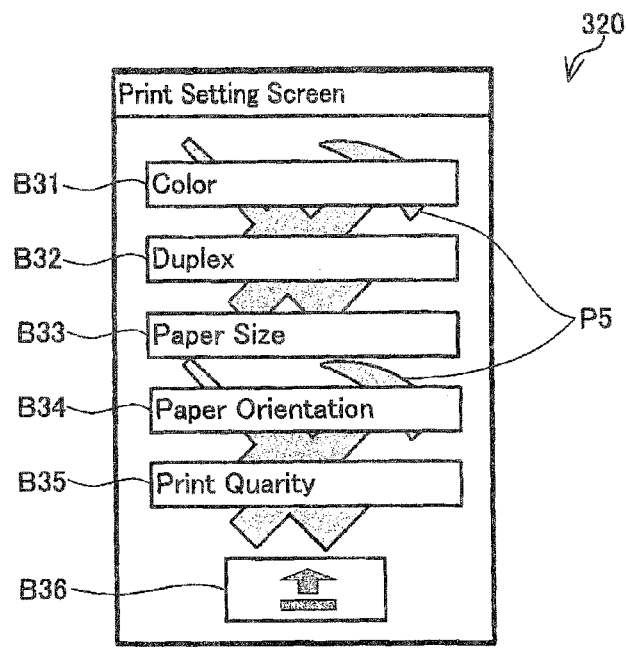
FIG. 6 illustrates an example of a print setting screen.

In S260, the print application 21a causes a print setting screen to be displayed on the panel 18. The print setting screen is a screen for accepting inputs of various settings when the printer 110 executes print process. FIG. 6 illustrates an example of the print setting screen 320. The print setting screen 320 includes button images B31 to B36. The button image B31 is an image for accepting settings of color printing and monochrome printing. The button image B32 is an image for accepting whether or not to execute duplex printing. The button image B33 is an image for accepting a selection of a printing paper size. The button image B34 is an image for accepting a selection of a printing paper orientation. The button image B35 is an image for accepting a selection of printing quality. The button image B36 is an image for accepting an input of an upload instruction. The upload instruction is an instruction for uploading a submit target file to the print intermediation server 100.

Furthermore, the print setting screen 320 includes a fifth background image P5 as a background of the button images B31 to B36. The fifth background image P5 is an image indicating that the print setting screen 320 is a screen for accepting inputs of various printing settings.

In S265, the print application 21a accepts an input of an upload instruction by the user. The input of the upload instruction may also be accepted by detecting a tap input to the button image B36.

Figure 7:
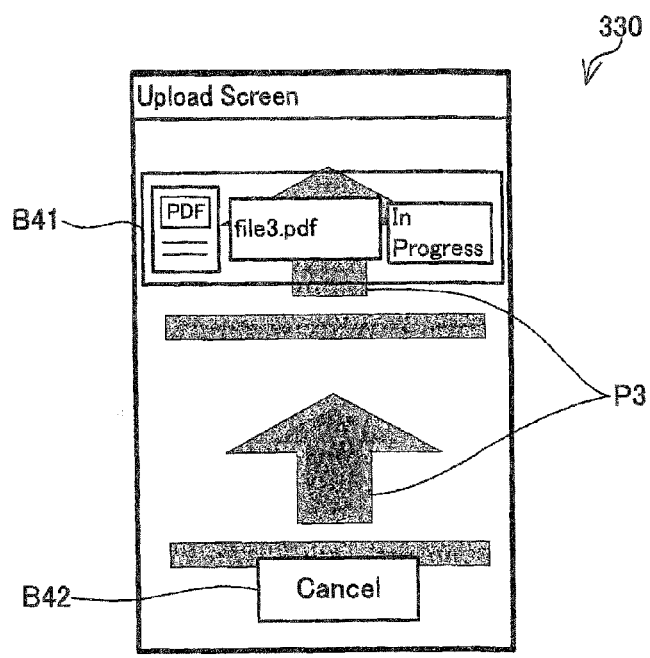
FIG. 7 illustrates an example of an upload screen.

In S270, the print application 21a causes an upload screen to be displayed on the panel 18. The upload screen is a screen to inform the user that the process of uploading the file to the print intermediation server 100 is in progress. FIG. 7 shows an example of an upload screen 330. The upload screen 330 includes button images B41 and B42. The button image B41 is an image indicating the file F3 uploaded to the print intermediation server 100. The button image B42 is an image for accepting an input of an instruction for cancelling uploading of the file F3 to the print intermediation server 100.

The upload screen 330 includes a third background image P3 as a background of the button images B41 and B42. The third background image P3 is an image indicating that the upload screen 330 is a screen showing that the upload process is in progress. The design of the third background image P3 is a design that reminds the user of the upload process and may be a design that uses, for example, data transfer as a motif. More specifically, the design of the third background image P3 may be a design that uses an arrow in a predetermined direction (e.g., upward direction) as a motif.

The print application 21a causes the upload screen to be displayed on the panel 18 and creates a submit request in S272. The submit request includes a printer ID in the storage unit 12, the file F3 selected by the user as a submit target and the file name N3 of the file F3. The print application 21a may acquire a list of printer IDs associated with the account information AC1 in S272 from the print intermediation server 100 and select a printer ID of a target to which the file F3 is submitted from the list. In this case, in S272, the printer ID included in the submit request is a selected printer ID. A screen for selecting a printer ID may be displayed and a printer ID specified by a user input may be selected.

In S275, the print application 21a supplies a submit request to the print intermediation server 100 via the mobile phone I/F 22. In S276, the print intermediation server 100 creates a job identification information ID3. The job identification information ID3 is specific information for identifying a print job using the file F3.

In S277, the print intermediation server 100 causes the file F3, the file name N3 and the job identification information ID3 to be stored in the storage unit 101 in association with the printer ID included in the submit request. As a result, in the print intermediation server 100, a transition takes place from the submit contents X1 to the submit contents X2 (see FIG. 2). In S280, the print intermediation server 100 supplies a submit success result to the mobile phone 10.

The print application 21a acquires the submit success result from the print intermediation server 100 via the mobile phone I/F 22. This ends the submit process for submitting one file F3 to the print intermediation server 100. The flow then returns to S228.

Upon returning to S228, the print application 21a creates a file list request again. In S230, the print application 21a supplies the created file list request to the print intermediation server 100. In S235, the print intermediation server 100 supplies the file list based on the transitioned submit contents X2 to the mobile phone 10. The file list includes three file names N1 to N3 for identifying the three files F1 to F3 and three pieces of job identification information ID1 to ID3. In S240, the print application 21a causes the server storage contents screen to be displayed on the panel 18 using the file list based on the submit contents X2.

Figure 8:
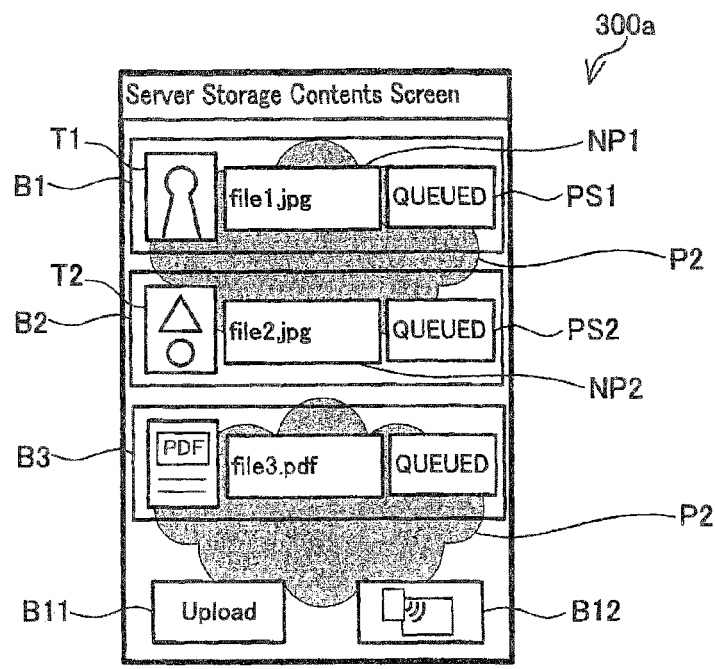
FIG. 8 illustrates an example of a server storage contents screen.

FIG. 8 shows an example of a server storage contents screen 300a. In the server storage contents screen 300a in FIG. 8, a button image B3 is added to the server storage contents screen 300 in FIG. 4. The button image B3 is an image indicating the file F3 additionally stored in the print intermediation server 100 in a submit process.

(Print Process)

After displaying the server storage contents screen 300a (FIG. 8), the print application 21a accepts a selection of a file to be subjected to a print process in S240. The print process is a process in which the mobile phone 10 causes the printer 110 to execute printing. More specifically, the print application 21a accepts a selection of one or more button images from among the button images B1 to B3. A selection of the button images may be accepted by detecting a tap input to any one of areas in which the button images B1 to B3 are displayed. In the present embodiment, the following description will be continued by taking a case where the button image B1 is tapped by the user and the file F1 is selected as a target of the print process as an example.

In the print process, the user of the mobile phone 10 needs to be located near the printer 110. This is because the mobile phone 10 and the printer 110 need to execute NFC communication as will be described later. Therefore, after coming home from outside, for example, the user causes the printer 110 to execute printing using the mobile phone 10.

In S245, in response to accepting an input of an instruction for print process execution (S245: printing), the flow proceeds to S285 where a print process starts. The print process execution instruction is accepted by a tap input to the button image B12 in FIG. 8.

Figure 9:
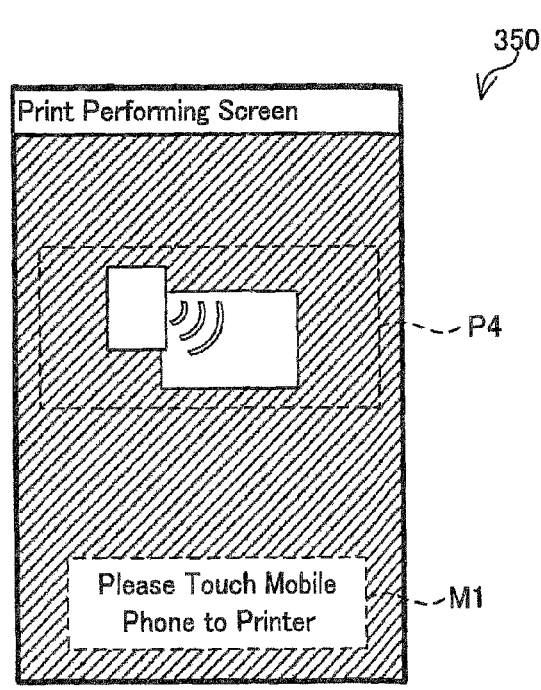
FIG. 9 illustrates an example of a print performing screen.

In response to the tap input to the button image B12, in S285, the print application 21a causes a print performing screen to be displayed on the panel 18. That is, the button image B12 also functions as an image to accept the input of an instruction for displaying the print performing screen (FIG. 9). The print performing screen is a screen to accept an input of an instruction for executing a process of sending print instruction information to the printer 110. The print instruction information is information for instructing the printer 110 to print the file selected in S240.

FIG. 9 illustrates an example of a print performing screen 350. The print performing screen 350 includes a message M1 that urges the user to bring the mobile phone 10 close to the printer 110. The print performing screen 350 includes a fourth background image P4 as a background. The fourth background image P4 is an image that urges the user to bring the mobile phone 10 close to the printer 110. The design of the fourth background image P4 may be similar to the design of each button image B12 (see FIG. 4 and FIG. 8) of each server storage contents screen 300, 300a. The fourth background image P4 may also have a size greater than that of the button image B12.

The hue of the background color of the print performing screen 350 may be different from the hues of the background colors of the server storage contents screens 300 and 300a, the mobile phone storage contents screen 310, the print setting screen 320 and the upload screen 330. For example, the hue of the background color of the print performing screen 350 may be set to yellow or the like and the hue of the server storage contents screen 300 or the like may be set to monochrome.

In S290, the print application 21a determines whether or not the mobile phone 10 has touched the printer 110. In the case of a negative determination (S290: NO), the flow returns to S290. On the other hand, in the case of a positive determination (S290: YES), NFC communication 200 is established between the NFC_UF 15 of the mobile phone 10 and the NFC_UF 116 of the printer 110, and the flow proceeds to S295.

In S295, the print application 21a sends print instruction information to the printer 110 using the NFC communication 200. The print instruction information includes the job identification information ID1 and an authentication token. The job identification information ID1 is information for identifying a job using the file F1 selected by the user as a target of a print process.

Upon accepting the print instruction information from the mobile phone 10, the CPU 132 of the printer 110 creates a print data request. The print data request includes the authentication token and the job identification information ID1 in the printing instruction. In S300, the CPU 132 supplies the print data request to the print intermediation server 100 via the wireless LAN_I/F 118 using a URL of the print intermediation server 100 stored in advance in the storage unit 134.

Upon acquiring the print data request from the printer 110, the print intermediation server 100 executes authentication of the authentication token included in the print data request. Upon determining that the authentication token and the printer ID are registered (that is, when the authentication succeeds), in S315, the print intermediation server 100 executes a convert process on the file identified by the job identification information included in the print data request (that is, file F1 identified by the job identification information ID1). In the convert process, the file F1 is converted and print data D1 having a data format that can be interpreted by the printer 110 is created. In the convert process, for example, the file may also be converted to print data in a PDF format. In S320, the print intermediation server 100 supplies the print data D1 to the printer 110.

The CPU 132 of the printer 110 acquires the print data D1 from the print intermediation server 100 via the wireless LAN_I/F 118. In S325, the CPU 132 supplies the acquired print data D1 to the print performing unit 120. As a result, the print performing unit 120 prints an image expressed by the print data D1 to printing paper. This allows the user of the mobile phone 10 to acquire the printed printing paper.

(Effects)

In the communication system 1, printing is executed by handling a file in each of three nodes: the mobile phone 10, the print intermediation server 100 and the printer 110. The print process using the three nodes is controlled by the mobile phone 10. Since states of the three nodes are displayed respectively on the panel 18 of the mobile phone 10, the user may get confused about which node corresponds to the information displayed on the panel 18. The print application 21a displays the mobile phone storage contents screen 310 (see FIG. 5) including information relating to the files stored in the mobile phone 10 and displays the server storage contents screen 300, 300a (see FIG. 4 and FIG. 8) including information relating to the files stored in the print intermediation server 100. The mobile phone storage contents screen 310 includes the first background image P1 as a background image. This allows the user to intuitively recognize that the information relating to the files stored in the mobile phone 10 is displayed by only looking the first background image P1. Furthermore, the server storage contents screen 300 includes the second background image P2 as a background image. This allows the user to intuitively recognize that the information relating to the files stored in the print intermediation server 100 is displayed by only looking the second background image P2. Moreover, the background image allows the user to recognize which node stores the file whose information is displayed, and it is thereby possible to efficiently use the display area of the panel 18.

The print application 21a causes the upload screen 330 (see FIG. 7) to be displayed on the panel 18 (S270) in response to accepting an input of an upload instruction from the user (S265). This allows the user to recognize that the process of uploading the file to the print intermediation server 100 is in progress. Therefore, it is possible to allow the user to appropriately recognize the process state of the mobile phone 10.

The print application 21a can cause the mobile phone storage contents screen 310 for displaying a list of files stored in the mobile phone 10 to be displayed on the panel 18 (S250) and cause a first file selected (S255) from among the files stored in the mobile phone 10 to be stored in the print intermediation server (S277). The print application 21a can cause the server storage contents screens 300 and 300a for displaying a list of the files stored in the print intermediation server 100 to be displayed on the panel 18 (S240) and execute a print process (S325) using a second file selected (S240) from among the files stored in the print intermediation server 100. The print application 21a can allow the user to easily distinguish the first file selection operation from the second file selection operation by using the first background image P1 and the second background image P2 in the mobile phone storage contents screen 310 and the server storage contents screens 300 and 300a. It is thereby possible to prevent the user from confusing the first file selection operation with the second file selection operation.

The print application 21a can cause the print performing screen 350 (see FIG. 9) to be displayed on the panel 18 (S285) in response to accepting an input of a print process execution instruction (printing in S245). The print performing screen 350 also includes the fourth background image P4 for urging the user to bring the mobile phone 10 close to the printer 110. It is thereby possible to inform the user that the printer 110 is enabled to execute the print process, using the fourth background image P4.

The print application 21a allows the display screen to transition (S285) to the print performing screen 350 (see FIG. 9) including the fourth background image P4 in response to a tap input to the button image B12 (see FIG. 4 and FIG. 8) included in the server storage contents screens 300 and 300a (printing in S245). The design of the fourth background image P4 is made to similar to the design of the button image B12. This allows the user to intuitively recognize that the button image B12 and the print performing screen 350 are associated with each other. Therefore, it is possible to allow the user to recognize the relationship between the server storage contents screen 300 or 300a and the print performing screen 350 and thereby prevent the user from getting confused by screen transition.

In response to uploading the file to the print intermediation server 100 (S275) and updating storage contents of the print intermediation server 100 (S277), the print application 21a can receive the file list indicating the updated storage contents from the print intermediation server 100 (S235) and cause the server storage contents screen indicating the updated storage contents to be displayed on the panel 18 (S240). That is, the server storage contents screen is displayed on the panel 18 at a plurality of different timings. The plurality of server storage contents screens displayed at the plurality of timings include the same second background image P2. This allows the user to recognize that the plurality of server storage contents screens displayed at the different timings are screens indicating the files stored in the print intermediation server 100. This can prevent the user from getting confused.

The print application 21a causes the hue of the background color of the screen used to communicate with the printer 110 (that is, the print performing screen 350 (FIG. 9)) to be different from the hue of the background color of the screen used to communicate with the print intermediation server 100 (that is, the server storage contents screens 300 and 300a (FIG. 4 and FIG. 8), the mobile phone storage contents screen 310 (FIG. 5), the print setting screen 320 (FIG. 6), and the upload screen 330 (FIG. 7)). This allows the user to intuitively recognize whether the communication destination is the printer 110 or the print intermediation server 100 by looking the background color. In addition, since the background color is used, it is possible to efficiently use the display area of the panel 18.

The print application 21a causes a folder image (e.g., folder image FD21) indicating a folder to be displayed on the mobile phone storage contents screen 310 (see FIG. 5). However, the print application 21a does not allow the folder image to be displayed on the server storage contents screens 300 and 300a (see FIG. 4 and FIG. 8). This allows the user to visually recognize that each file is stored in the file storage area 23 in the hierarchic structure of folders and files in the mobile phone 10. The user can also visually recognize that each file is stored in the storage unit 101 without any hierarchic structure being used in the print intermediation server 100.

The mobile phone storage contents screen 310 in FIG. 5 includes a first display area A1 to display a title and a second display area A2 to display button images. The ratio of the area of the first background image P1 to the total area of the mobile phone storage contents screen 310 is 25% or more of the maximum display area (that is, the second display area A2) included in the mobile phone storage contents screen 310. This can make the first background image P1 noticeable, which allows the user to appropriately recognize the first background image P1. The second background image P2 to fourth background image P4 also have the same display area as that of the first background image P1, which allows the user to appropriately recognize the second background image P2 to fourth background image P4 respectively.

The print application 21a causes the first background image P1 (see FIG. 5) to fourth background image (see FIG. 9) to be displayed using an appropriate design. This allows the user to visually appropriately recognize various kinds of information.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

(Modifications)

In the above print process, processes are carried forward sequentially in order of a selection of a file to be uploaded (S255), uploading of the file (S275), selection of a file to be printed (S240). Therefore, on the panel 18, screens transition from one to another in order of the mobile phone storage contents screen 310, the upload screen 330, the server storage contents screens 300 and 300a. The print application 21a may change brightness or saturation of the background color of each screen in a phased manner in order of the mobile phone storage contents screen 310, the upload screen 330, the server storage contents screens 300 and 300a. For example, the background color of each screen may change so that the brightness increases in a phased manner or the background color of each screen may change so that the saturation increases in a phased manner. This causes the background color to become brighter as the process advances, allowing the user to intuitively recognize how each process advances.

The position of the first background image P1 in the mobile phone storage contents screen 310 may be set optionally. For example, the position of the first background image P1 may be a center position of the maximum display area (that is, the second display area A2) included in the mobile phone storage contents screen 310. This can make the first background image P1 noticeable, allowing the user to appropriately recognize the first background image P1. Moreover, the positions of the second background image P2 to the fourth background image P4 may be set in the same way as that of the first background image P1. This allows the user to appropriately recognize the second background image P2 to the fourth background image P4.

The mobile phone 10 may set the brightness and/or saturation of a theme color including the background color of a screen displayed on the panel 18 to an optional value. In this case, the print application 21a may cause the first background image P1 having brightness or saturation of a phase opposite to that of the brightness or saturation of the background color of the mobile phone storage contents screen 310 to be displayed on the panel 18. For example, the background color of the mobile phone storage contents screen 310 may be white and the color of the first background image P1 may be gray. The background color of the mobile phone storage contents screen 310 may be black and the color of the first background image P1 may be white. This can make the first background image P1 noticeable, allowing the user to appropriately recognize the first background image P1. Moreover, the brightness or saturation of the second background image P2 to the fourth background image P4 may be set in the same way as that of the first background image P1. This allows the user to appropriately recognize the second background image P2 to the fourth background image P4.

The fourth background image P4 (see FIG. 9) may include a design indicating that data is outputted from the mobile phone 10 to the device which the mobile phone 10 should approach (that is, communication via the NFC communication 200 is carried out as the mobile phone 10 approaches the printer 110). More specifically, the fourth background image P4 (see FIG. 9) may include a design including graphics indicating the mobile phone 10 and graphics indicating data outputted from the mobile phone 10. An example of the graphics indicating the mobile phone 10 is a rectangle. An example of the graphics indicating data is a dotted line that expands in a fan shape (that is, a line representing wireless communication).

Moreover, the fourth background image P4 (see FIG. 9) may include a design indicating that the device is provided with an NFC I/F (that is, a design described in the case of the device provided with an NFC I/F). An example of the design is a logo mark indicating that NFC communication can be executed. Another example of the design is a design indicating a touch position of NFC described in the case of the device of the printer 110.

Selections of all files may be accepted in the process for accepting a selection of a file to be submitted to the print intermediation server 100 (S255) and the process for accepting a selection of a file to be subjected to the print process (S240).

A display instruction of the print performing screen 350 is not limited to instructions accepted via a button image (e.g., button image B12 (see FIG. 4)) for explicitly accepting an input of the display instruction. For example, in S240, accepting an input of operation of selecting a file to be subjected to a print process may also serve as accepting an input of a display instruction of the print performing screen 350. This makes it possible to reduce the number of operations that should be inputted by the user and thereby improve convenience.

In the convert process in S315, various types of convert process may be executed. For example, a convert process may be executed for converting files into a format in which the printer 110 can print the files. Moreover, for example, files may be converted in accordance with the printing setting inputted in S260. The convert process is not limited to the mode in which the convert process is executed by the print intermediation server 100 but may be executed by an external server (not shown).

In S255, a plurality of files on which the submit process is executed may be selected. In this case, for example, the mobile phone storage contents screen 310 includes an OK button image and a plurality of files may be selected by tapping the OK button image after tapping a plurality of button images indicating a plurality of files.

Information acquired in preparations is not limited to the account information AC1. For example, the print application 21a may acquire a refresh token for acquiring an authentication token from the print intermediation server 100. Before creating a submit request (S272) and before creating a file list request (S228), the print application 21a may send a refresh token to the print intermediation server 100 and acquire and use an authentication token. In this case, the print application 21a may send a refresh token to the printer 110 in S295. Before sending a print data request (S300), the printer 110 may send a refresh token to the print intermediation server 100 and acquire and use an authentication token.

In preparations, a so-called OAuth technique may be used. In preparations, an authentication token which can be used in a submit process and a print process later may be acquired from the print intermediation server 100. In this case, the print application 21*a* may use the authentication token acquired in preparations when sending a submit request (S275) and sending a file list request (S230). The printer 110 may receive an authentication token acquired in preparations in S295 and use the authentication token to send a print data request (S300).

In S295, the print application 21*a* may send a printing instruction including a job name N1 to the printer 110. In this case, the print intermediation server 100 may execute a convert process on the file F1 identified by the job name N1 in S315.

In S295, the print application 21*a* may send a printing instruction including the printer ID to the printer 110. In this case, in 5300, the printer 110 may send a print data request including the printer ID to the print intermediation server 100.

The process for accepting an input of a printing setting (S260) can be omitted. In this case, the flow may advance from S255 to S270. The process of displaying the print performing screen (S285) may be omitted. Generally speaking, the print application 21*a* may cause at least the "first screen" and the "second screen" to be displayed. More specifically, the print application 21*a* may execute at least S250 and S240.

Instead of executing the NFC communication 200, the printer 110 and the mobile phone 10 may execute short-range wireless communication according to another communication system (for example, wireless communication such as Transfer Jet communication or infrared ray communication). Further, the printer 110 and the mobile phone 10 may execute wireless communication according to a Wi-Fi system instead of executing the NFC communication 200. Furthermore, instead of executing wireless communication, the printer 110 and the mobile phone 10 may execute wire communication. Generally speaking, any kind of communication system may be adopted as long as it is possible for the mobile phone 10 and the printer 110 to communicate with each other.

The mobile phone 10 may perform wireless communication according to a Wi-Fi system, and carry out communication of various kinds of information (for example: the submit request) with the print intermediation server 100. In a case where the mobile phone 10 is connected by wire to the Internet 70, the mobile phone 10 may perform wire communication and carry out communication with the print intermediation server 100. Generally speaking, any kind of communication system may be adopted as long as it is possible for the mobile phone 10 and the print intermediation server 100 to communicate with each other.

In a case where the printer 110 is connected by wire to the Internet 70, the printer 110 may perform wire communication and carry out communication of various kinds of information (for example: the file list) with the print intermediation server 100. Generally speaking, any kind of communication system may be adopted as long as it is possible for the printer 110 and the print intermediation server 100 to communicate with each other.

The print intermediation server 100 need not be a single server, and may be a plurality of servers that are constituted by separate members. For example, the print intermediation server 100 may include a first server that executes the respective processing operations shown in the registration process, and a second server (that is, a second server that is constituted separately from the first server) that executes the respective processing operations shown in the print process.

A device on which the print application 21*a* operates is not limited to the mobile phone 10, and may be a stationary PC or may be another device (for example, a television or the like).

Figure 2:
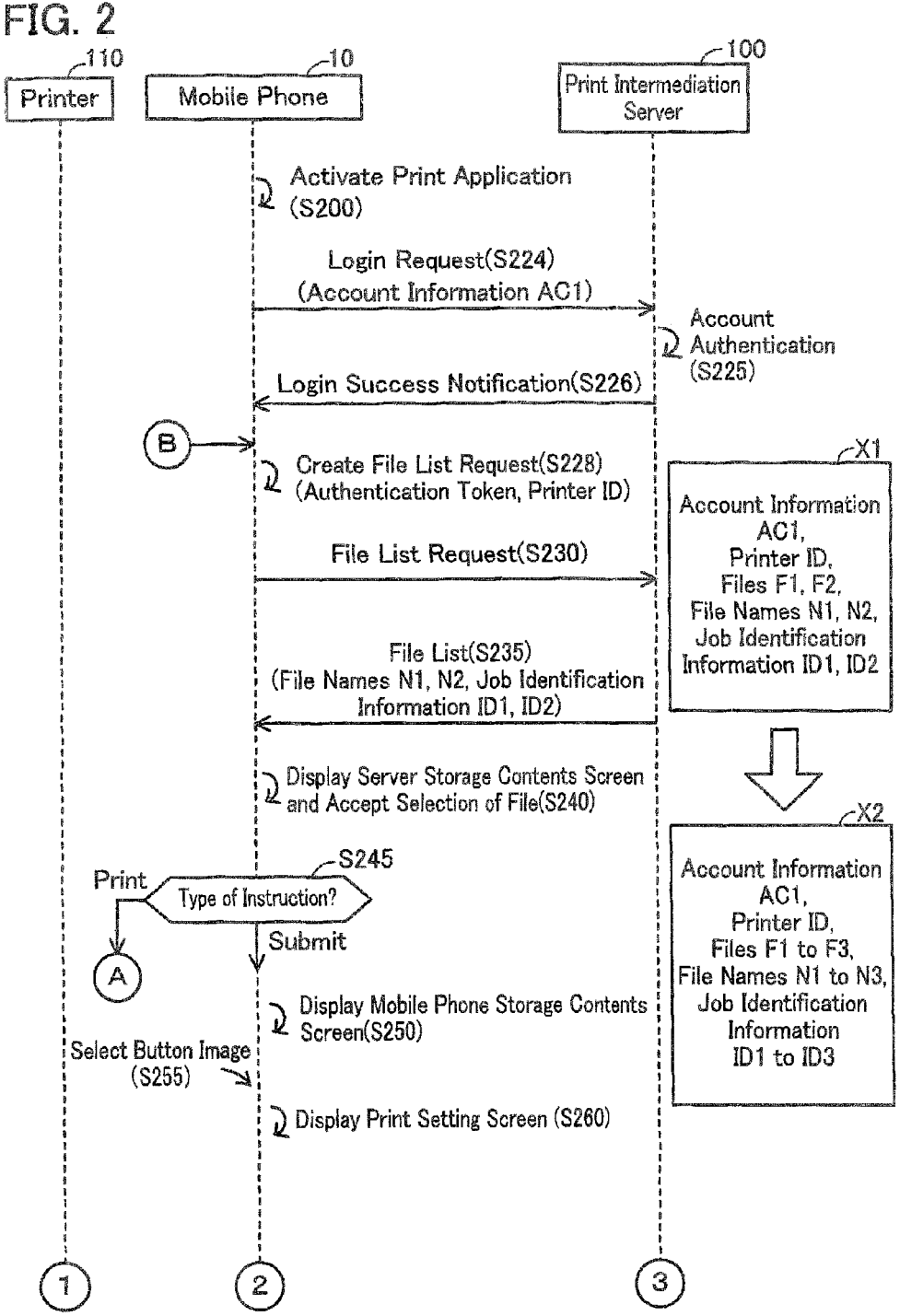
FIG. 2 illustrates an operation sequence diagram of a print application.
Figure 3:
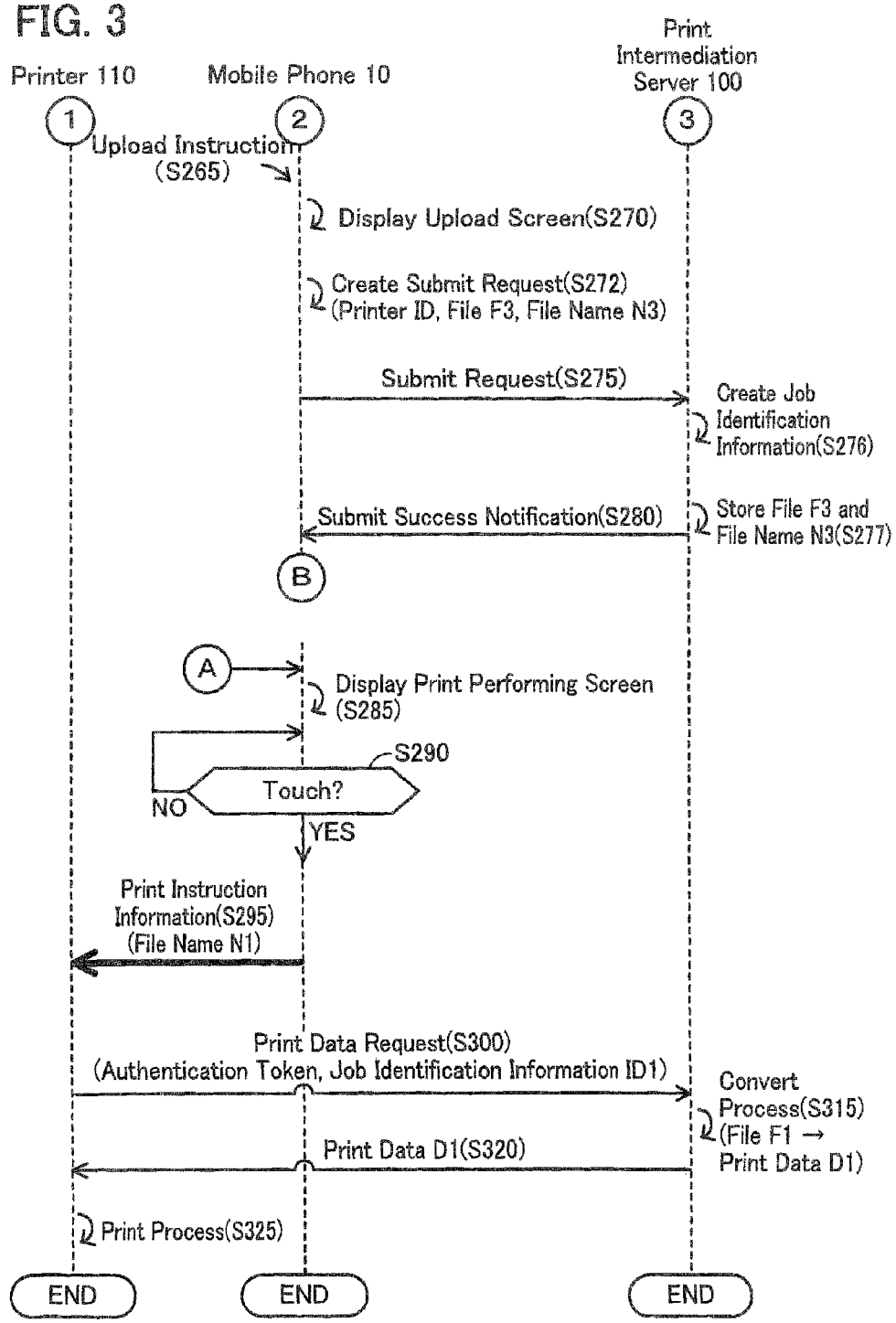
FIG. 3 illustrates an operation sequence diagram of the print application.

In the respective embodiments described above, the respective processing operations illustrated in FIG. 2 to FIG. 3 and the like are realized by the CPU 132 of the printer 110 and the CPU 11 of the mobile phone 10 executing programs stored in the storage units 134 and 12. However, a configuration may also be adopted in which, instead, at least one of the respective processing operations illustrated in FIG. 2 to FIG. 3 and the like is realized by hardware such as a logical circuit.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The invention claimed is:

1. A non-transitory computer-readable recording medium storing computer-readable instructions for an information processing device,
the computer-readable instructions, when executed by a processor of the information processing device, causing the information processing device to perform:
accepting an instruction for displaying a first screen;
causing a display unit of the information processing device to display the first screen, in response to accepting the instruction for displaying the first screen, the first screen including M pieces of first images indicating M pieces of data stored in a first storage unit of the information processing device, the M being an integer equal to 1 or more, the first screen including a first background image as a background of the M pieces of first images;
executing a first process using first selected data corresponding to a first image selected by a user from among the M pieces of first images via the first screen;
requesting a server device, via a communication interface of the information processing device, for identification information which identifies data stored in a second storage unit of the server device;
causing the display unit to display a second screen, in response to receiving, from the server device via the communication interface, N pieces of identification information for identifying N pieces of data stored in the second storage unit, the second screen including N pieces of second images indicating the N pieces of identification information, the N being an integer equal to 1 or more, the second screen including a second background image as a background of the N pieces of second images, the second background image being different from the first background image; and
executing a second process using second selected data corresponding to a second image selected by the user from among the N pieces of second images via the second screen.

2. The non-transitory computer-readable recording medium as in claim 1, wherein
the computer-readable instructions, when executed by the processor of the information processing device, cause the information processing device to further perform:
accepting an instruction for communicating target data with the server device, the target data corresponding to an image selected by the user;
causing the display unit to display a third screen, in response to accepting the instruction for communicating the target data with the server device, the third screen including a third image indicating the target data, the third screen including a third background image as a background of the third image, the third background image being different from the first background image and the second background image.

3. The non-transitory computer-readable recording medium as in claim 2, wherein
a brightness or saturation of a background color is changed in a phased manner in an order of the first screen, the third screen, and the second screen.

4. The non-transitory computer-readable recording medium as in claim 1, wherein
the first process includes sending the first selected data to the server device via the communication interface so as to store the first selected data in the second storage.

5. The non-transitory computer-readable recording medium as in claim 4, wherein
the computer-readable instructions, when executed by the processor of the information processing device, cause the information processing device to further perform:
receiving, from the server device via the communication interface, the N pieces of identification information for identifying the N pieces of data including the first selected data stored in the second storage unit, in response to sending the first selected data to the server device; and
causing the display unit to display the second screen, in response to receiving the N pieces of identification information from the server device.

6. The non-transitory computer-readable recording medium as in claim 5, wherein
the second process includes sending print performing information to a printer via the communication interface in order to cause the printer to execute a print of the second selected data.

7. The non-transitory computer-readable recording medium as in claim 5, wherein
the information processing device is a mobile phone comprising a touch panel,
each of the M pieces of first images is an icon configured to accept a touch from the user,
each of the N pieces of second images is an icon configured to accept a touch from the user,
in the first screen, the M pieces of first images are aligned in accordance with a predetermined layout, and
in the second screen, the N pieces of second images are aligned in accordance with the predetermined layout.

8. The non-transitory computer-readable recording medium as in claim 4, wherein
the causing the display unit to display the first screen is performed, in response to accepting the instruction for displaying the first screen via the second screen,
the computer-readable instructions, when executed by the processor of the information processing device, cause the information processing device to further perform:
receiving, from the server device via the communication interface, N+1 pieces of identification information for identifying N+1 pieces of data including the first selected data stored in the second storage unit, in response to sending the first selected data to the server device; and
causing the display unit to display a new second screen, in response to receiving the N+1 pieces of identification information from the server device, the new second screen including N+1 pieces of second images indicating the N+1 pieces of identification information, the new second screen including the second background image as a background of the N+1 pieces of second images.

9. The non-transitory computer-readable recording medium as in claim 8, wherein
the second process includes sending print performing information to a printer via the communication interface in order to cause the printer to execute a print of the second selected data.

10. The non-transitory computer-readable recording medium as in claim 8, wherein
the information processing device is a mobile phone comprising a touch panel,
each of the M pieces of first images is an icon configured to accept a touch from the user,
each of the N pieces of second images is an icon configured to accept a touch from the user,
in the first screen, the M pieces of first images are aligned in accordance with a predetermined layout, and
in the second screen, the N pieces of second images are aligned in accordance with the predetermined layout.

11. The non-transitory computer-readable recording medium as in claim 1, wherein
the computer-readable instructions, when executed by the processor of the information processing device, cause the information processing device to further perform:
accepting an instruction for displaying a fourth screen;
causing the display unit to display the fourth screen, in response to accepting the instruction for displaying the fourth screen, the fourth screen being for accepting an input of a print performing instruction, the print performing instruction being for sending print performing information to a printer via the communication interface in order to cause the printer to execute a print of the second selected data, the fourth screen including a fourth background image being different from the first background image and the second background image,
wherein the first process includes sending, in response to accepting the input of the print performing instruction after the fourth screen is displayed, the first selected data to the server device via the communication interface so as to store the first selected data in the second storage.

12. The non-transitory computer-readable recording medium as in claim 11, wherein
the second screen includes a button image for accepting an input of the instruction for displaying the fourth screen, and
the fourth background image has a design similar to the button image and has a size which is greater than the button image.

13. The non-transitory computer-readable recording medium as in claim 11, wherein
a hue of a background color of the fourth screen is different from hues of back ground colors of the first screen and the second screen.

14. The non-transitory computer-readable recording medium as in claim 1, wherein
a percentage of the first background image in the largest display area among one or more display areas included in the first screen is equal to or more than 25%, and
a percentage of the second background image in the largest display area among one or more display areas included in the second screen is equal to or more than 25%.

15. The non-transitory computer-readable recording medium as in claim 1, wherein
the first background image is located at a center of the largest display area among one or more display areas included in the first screen, and the second background image is located at a center of the largest display area among one or more display areas included in the second screen.

16. The non-transitory computer-readable recording medium as in claim 1, wherein
the first background image has a brightness or saturation which is an opposite phase from a brightness or saturation of a background color of the first screen, and
the second background image has a brightness or saturation which is an opposite phase from a brightness or saturation of a background color of the second screen.

17. The non-transitory computer-readable recording medium as in claim 1, wherein
the first background image has a design representing a data storage folder.

18. The non-transitory computer-readable recording medium as in claim 1, wherein
the second background image has a design representing a cloud network.

19. The non-transitory computer-readable recording medium as in claim 2, wherein
the third background image has a design representing a transfer of data.

20. The non-transitory computer-readable recording medium as in claim 11, wherein
the fourth background image has a design representing that it is capable of communicating with the printer via the communication interface in response to the information processing device being close to the printer.

21. The non-transitory computer-readable recording medium as in claim 11, wherein
the communication interface includes an NFC communication interface,
the fourth background image has a design representing a graphic being described in a device which comprises the NFC communication interface.

22. An information processing device comprising:
a display unit;
a first storage unit;
a communication interface;
a processor; and
a memory storing computer-readable instructions therein, the computer-readable instructions, when executed by the processor, causing the information processing device to perform:
accepting an instruction for displaying a first screen;
causing the display unit to display the first screen, in response to accepting the instruction for displaying the first screen, the first screen including M pieces of first images indicating M pieces of data stored in the first storage unit, the M being an integer equal to 1 or more, the first screen including a first background image as a background of the M pieces of first images;
executing a first process using first selected data corresponding to a first image selected by a user from among the M pieces of first images via the first screen;
requesting a server device, via the communication interface, for identification information which identifies data stored in a second storage unit of the server device;
causing the display unit to display a second screen, in response to receiving, from the server device via the communication interface, N pieces of identification information for identifying N pieces of data stored in the second storage unit, the second screen including N pieces of second images indicating the N pieces of identification information, the N being an integer equal to 1 or more, the second screen including a second background image as a background of the N pieces of second images, the second background image being different from the first background image; and
executing a second process using second selected data corresponding to a second image selected by the user from among the N pieces of second images via the second screen.

* * * * *